United States Patent [19]
DeMania et al.

[11] 3,714,478
[45] Jan. 30, 1973

[54] GAS COOLED DYNAMOELECTRIC MACHINE

[75] Inventors: Dominic DeMania, Schenectady, N.Y.; Allan C. Shartrand; Sterling C. Barton, both of Scotia, all of N.Y.

[73] Assignee: General Electric Company

[22] Filed: March 2, 1972

[21] Appl. No.: 231,157

[52] U.S. Cl. .........................310/55, 310/57, 310/58
[51] Int. Cl. ..............................................H02k 9/00
[58] Field of Search..........310/52, 53, 55, 57, 58, 59, 310/64, 65

[56]     References Cited

UNITED STATES PATENTS

| | | | |
|---|---|---|---|
| 2,742,582 | 4/1956 | Bahn | 310/55 |
| 3,461,329 | 8/1969 | Shartrand | 310/55 |
| 3,505,546 | 4/1970 | Victor | 310/55 |
| 3,652,881 | 10/1970 | Albright | 310/64 |

*Primary Examiner*—R. Skudy
*Attorney*—William C. Crutcher et al.

[57]     ABSTRACT

In a large, gas cooled, dynamoelectric machine, the gas coolant is transported to and from the end frames and the machine electromagnetic core by a number of axially disposed pipes which are mounted externally outside of a gas-tight outer wrapper which surrounds the core. All axial gas flow between the core and the end frames is directed through the external pipes. This invention permits a larger diameter rotor and core without increasing the diameter of the outer wrapper.

6 Claims, 4 Drawing Figures

3,714,478

GAS COOLED DYNAMOELECTRIC MACHINE

BACKGROUND OF THE INVENTION

This invention pertains generally to cooling systems for large, gas cooled, dynamoelectric machines; and, in particular, relates to an externally ducted cooling system which will permit the use of maximum diameter rotors and cores within a limited size outer wrapper.

The design and electrical rating of large dynamoelectric machines may be limited by the allowable overall physical dimensions of the machine relative to shipping requirements. It may be desirable or even critical to achieve the highest machine rating possible for a particular maximum diameter outer frame. One way of uprating a dynamoelectric machine is to increase the diameter of the inner electromagnetic core. However, this must be accomplished without increasing the overall size of the machine. Therefore, any arrangement which will permit the largest possible electromagnetic core diameter to be shipped within the limited envelop of railroad clearances will enhance the electrical rating and therefore the usefulness of the machine. One way of shipping maximum diameter inner cores is to employ the so-called "cage and core" construction as illustrated in U.S. Pat. No. 3,505,546 to Victor et al issued Apr. 7, 1970 and assigned to the assignee of the present invention. This construction illustrates one solution to the problem but is relatively complex in its execution.

The prior art discloses that the usual method of arranging coolant gas pipes is to include the pipes within the outer frame diameter. This is disadvantageous for two reasons. First, space which could be occupied by an enlarged diameter rotor and core, is occupied by the coolant pipes. Second, the outer frame and section plates are subject to severe vibratory stresses and, according to the prior art, holes must be allocated in the section plates to accommodate coolant pipes. These holes weaken the section plates, requiring enlarged section plates to compensate for the required holes cut out. Since the outer diameter of the wrapper is fixed by rail clearances, then the increase in section plate size must necessarily limit the size of the rotor and core.

SUMMARY OF THE INVENTION

In a large, gas cooled, dynamoelectric machine, an electromagnetic core is contained within a gas-tight outer mid-frame. Coolant gas is distributed to the electromagnetic core from a pair of end frames, each having a heat exchanger therein, by a plurality of externally mounted, axially extending gas pipes. Holes are provided in the end frames and the outer mid-frame for accommodating pipe ends. Axially spaced, solid section plates form a number of annular gas chambers between the core and outer frame for directing the coolant gas flow. To this end, "hot" and "cold" gas chambers alternate along the axial length of the core and receive respectively "hot" and "cold" gas pipes. All axial transport of coolant gas, with the exception of gas which flows in the air gap between the rotor and core is by means of the external pipes. The pipes are removable with respect to the dynamoelectric machine for testing and shipping. This construction permits the use of the largest diameter rotor and core within a limited size outer frame.

It is one object of the present invention to allow the use of a maximum diameter rotor and core within a limited diameter outer frame according to rail clearance requirements.

It is another object of the present invention to provide an outer frame having proper frequency and stiffness requirements.

It is another object of the present invention to provide a dynamoelectric machine which may be more easily tested, shipped and assembled.

It is still another object of the present invention to obviate the need for a "cage and core" construction.

Other objects and advantages will become apparent from the following description of one embodiment of the invention, and the novel features will be particularly pointed out hereinafter in the claims.

DETAILED DESCRIPTION OF THE INVENTION

Figure 1:
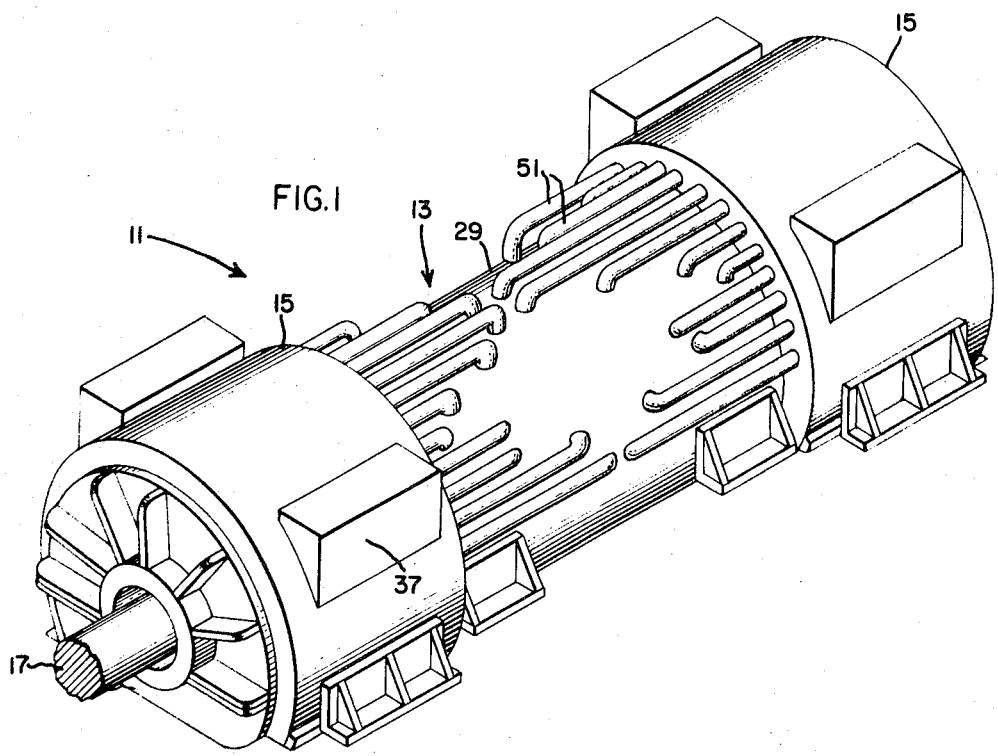
FIG. 1 is an isometric view of a gas cooled dynamoelectric machine with the present invention applied thereto.

Referring now to the drawings, a large gas cooled dynamoelectric machine 11 includes a middle section 13 disposed between a pair of end frames 15. A rotor 17 is housed within the dynamoelectric machine supported by rotor bearings 19 within each end frame.

A stationary armature electromagnetic core 21 surrounds the rotor and defines an air gap 23 therebetween. The core is housed in the middle section of the dynamoelectric machine. Surrounding the electromagnetic core are a number of axially spaced section plates 25, the outer periphery of which provides a support for an outer, gastight wrapper section 29.

Figures 3A, 3B:
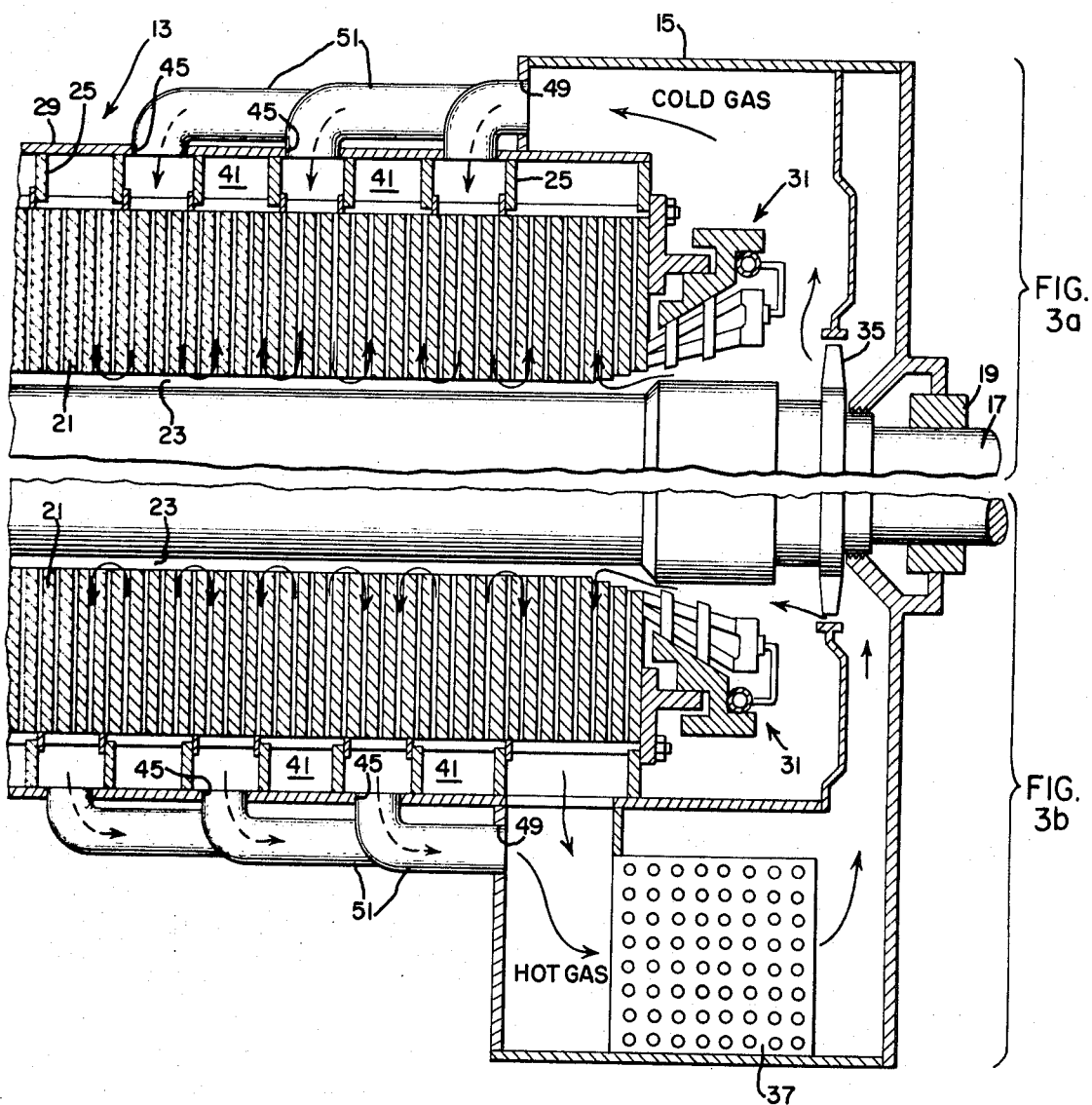
FIGS. 3a and 3b are composite, cross sections taken respectively along IIIa and IIIb on FIG. 2.

As seen in FIGS. 3a, 3b, the end frames 15, each include end windings 31, an axial flow fan 35 which is turned by the rotor and, in this embodiment, vertical heat exchangers 37. Various modifications and changes could be made in the above-described dynamoelectric machine without affecting the scope of the invention hereinafter described; for instance, a radial flow fan could be used and also horizontal heat exchangers.

The outer wrapper 29, the section plates 25 and the electromagnetic core form a plurality of annular gas chambers 41. The annular gas chambers alternate with respect to the relative temperature of the gas flowing therethrough and may be labeled as "hot" gas chambers and "cold" gas chambers. Each gas chamber has at least one porthole 45 formed therein. The end frames each include a number of circumferentially spaced portholes 49.

Figure 2:
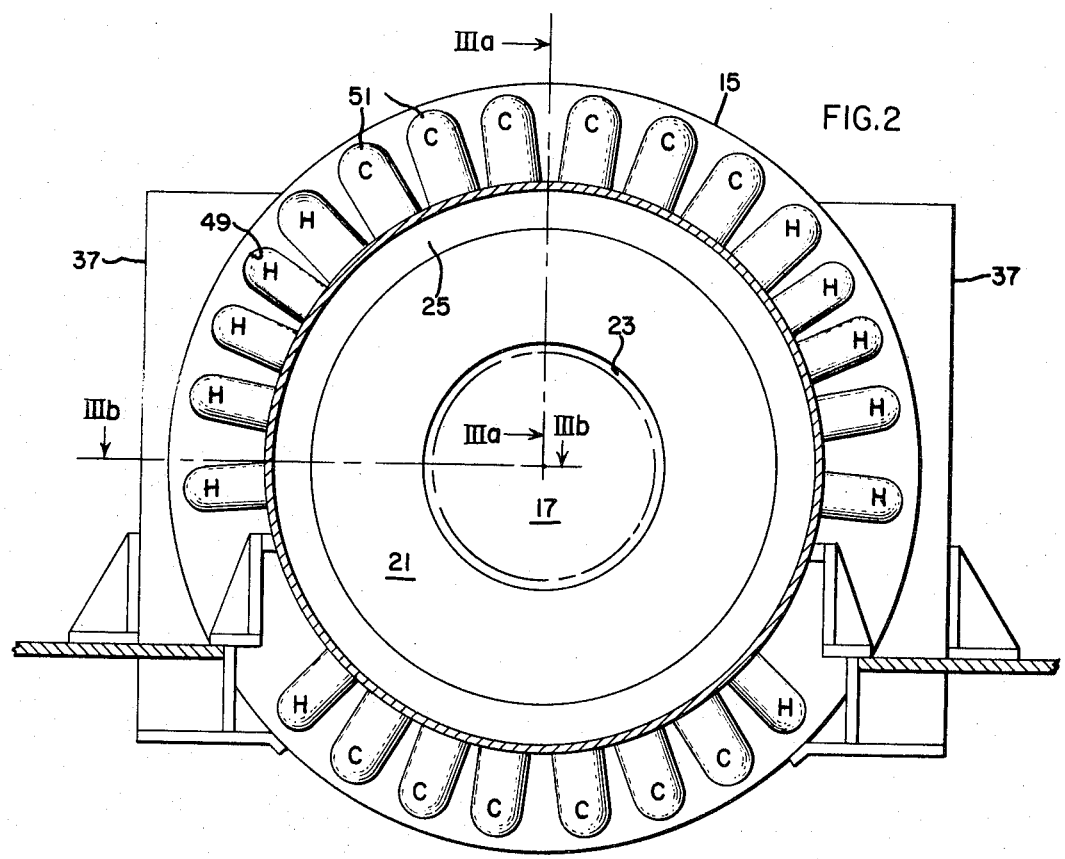
FIG. 2 is an end, cross-section view of a gas cooled dynamoelectric machine showing the preferred arrangement of coolant pipes when vertical heat exchangers are employed.

Interconnecting the gas chamber portholes 45 and the end frame portholes 49 are a number of pipes 51 which are mounted outside of the outer wrapper 29. These external pipes direct the flow of gas coolant axially to and from each end frame, and, to and from the electromagnetic core. The pipes may be classified as "hot" and "cold" pipes depending upon whether they are delivering or reclaiming gas with respect to the core. The preferred respective arrangement of "hot" and "cold" gas pipes is shown in FIG. 2, by reading the designation letter "H" or "C". Further, the composite FIGS. 3a and 3b illustrate the "hot" and "cold" flow of coolant gas along the axial length of the dynamoelectric machine.

The operation and resultant advantages of the invention will now be described with particular reference to FIGS. 3a and 3b and the flow arrows shown therein. Coolant gas (usually hydrogen) is directed by the axial fan 35 into external "cold" pipes 51 from the end frame into the "cold" annular gas chambers. The end frame is divided into sealed sections including a "cold" gas plenum and a "hot" gas plenum as indicated in FIGS. 3a and 3b, respectively. Specifically, the "cold" gas pipes interconnect the "cold" gas plenum with "cold" gas annular chambers. The "hot" gas pipes interconnect the "hot" gas plenum with the "hot" gas annular chambers. Once the "cold" gas is delivered into the annular "cold" gas chambers, it travels radially inward through the electromagnetic core to the air gap where it divides between adjacent "hot" gas annular chambers after flowing radially outwardly through the electromagnetic core. Externally mounted "hot" gas pipes then direct the "hot" gas to the "hot" gas plenum of an end frame where it is recycled through the heat exchangers. This operation is known in the prior art, except for the external pipe system and the arrangement thereof. From a study of FIGS. 3a and 3b, and assuming the outer frame to be of maximum outer diameter according to rail clearances, it should be quite obvious that if the prior art practice of mounting the pipes inside the frame was in use, then the alternative would be to decrease the diameter of the rotor and core so that the pipes could be contained within the outer wrapper. This necessity is obviated by the present invention.

Assembly and disassembly of the machine for testing and field erection may be accomplished by positioning the midsection between the pair of end frames. Once positioned thusly the pipes may be fixed into place. Heretofore, according to the prior art, it was required that the outer frame with internal gas pipes be circumscribed about the electromagnetic core as in the "cage and core" construction.

Another, not so obvious effect of the present construction, is that the need for portholes through the section plates for pipe fittings have been obviated. This allows maximum stiffness for any given radial depth of section plate.

While there is shown what is considered to be the preferred embodiment of the invention, it is of course understood that various other modifications may be made therein and it is intended to cover in the appended claims all such modifications as fall within the true spirit and scope of the invention.

What is claimed is:

1. In a gas cooled dynamoelectric machine having a rotor disposed within the bore of an electromagnetic core positioned between a pair of end frames, said rotor and said core having an air gap formed therebetween, said electromagnetic core of the type permitting a radially outward and inward flow of gas coolant; and, further including:
    a plurality of spaced section plates circumferentially mounted along the length of the electromagnetic core;
    a gas-tight outer wrapper circumscribed about said core and supported by said section plates;
    a plurality of alternating hot and cold annular gas chambers defined by said wrapper, said core and said section plates;
    a plurality of hot and cold gas pipes, directed axially along the electromagnetic core and mounted externally of the electromagnetic core frame outer wrapper; and,
    hot and cold gas plenums in the end frames interconnected respectively with said hot and cold annular gas chambers by said hot and cold gas pipes, whereby the axial transport of gas coolant to and from the end frames is through the externally mounted pipes outside the dynamoelectric machine outer wrapper.

2. The dynamoelectric machine as recited in claim 1 wherein the outer wrapper and the end frames are formed with portholes for receiving either ends of the hot and cold gas pipes.

3. The dynamoelectric machine as recited in claim 1 wherein the external pipes are of varying length according to the location of the annular gas chamber which is serviced.

4. The dynamoelectric machine as recited in claim 1 wherein the section plates comprise a plurality of solid annular rings disposed between the electromagnetic core and the outer wrapper.

5. The dynamoelectric machine as recited in claim 1 wherein the axial flow of substantially all gas coolant is through external pipes mounted outside the core wrapper.

6. The dynamoelectric machine as recited in claim 1 wherein the gas coolant pipes between the end frames and the annular chambers may be removed for shipment without removing the outer wrapper.

* * * * *